(12) United States Patent
Patel

(10) Patent No.: US 7,147,698 B2
(45) Date of Patent: *Dec. 12, 2006

(54) PHTHALOCYANINE COMPOUNDS USED IN INKS

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/530,895

(22) PCT Filed: Sep. 19, 2003

(86) PCT No.: PCT/GB03/04023

§ 371 (c)(1), (2), (4) Date: Apr. 11, 2005

(87) PCT Pub. No.: WO2004/035700

PCT Pub. Date: Apr. 29, 2004

(65) Prior Publication Data

US 2006/0156951 A1  Jul. 20, 2006

(30) Foreign Application Priority Data

Oct. 12, 2002 (GB) ................................. 0223819.4

(51) Int. Cl.
*C09D 11/02* (2006.01)
(52) U.S. Cl. .................. 106/31.49; 106/31.78
(58) Field of Classification Search ............. 106/31.49, 106/31.78; 540/133; 347/100; 428/195.1
See application file for complete search history.

(56) References Cited

U.S. PATENT DOCUMENTS

| | | | | |
|---|---|---|---|---|
| 3,053,850 A | * | 9/1962 | Clark et al. .................. 540/133 |
| 3,711,508 A | * | 1/1973 | Groll ........................... 540/132 |
| 4,732,615 A | * | 3/1988 | Kawashita et al. ...... 106/31.46 |
| 5,704,969 A | * | 1/1998 | Kanaya et al. ........... 106/31.48 |
| 5,922,116 A | * | 7/1999 | Mistry et al. ............. 106/31.47 |
| 6,149,722 A | * | 11/2000 | Robertson et al. ....... 106/31.49 |
| 6,607,589 B1 | * | 8/2003 | Adamic et al. .......... 106/31.49 |
| 6,712,891 B1 | * | 3/2004 | Decann et al. ........... 106/31.49 |
| 2005/0081748 A1 | * | 4/2005 | Patel ........................ 106/31.49 |
| 2005/0126436 A1 | * | 6/2005 | Patel et al. ............... 106/31.49 |

FOREIGN PATENT DOCUMENTS

| | | |
|---|---|---|
| EP | 1 243 626 | 9/2002 |
| EP | 1 254 932 | 11/2002 |
| JP | 45-7666 | 3/1970 |
| WO | 98 49240 | 11/1998 |
| WO | 99 67334 | 12/1999 |

* cited by examiner

*Primary Examiner*—Helene Klemanski
(74) *Attorney, Agent, or Firm*—Morgan Lewis & Bockius LLP

(57) ABSTRACT

Ink comprising a compound of Formula (1) and salts thereof: Formula (1) wherein: Pc represents a phthalocyanine nucleus of Formula (2); Formula (2) x is greater than 0 and less than 1.8; y and z are both greater than 0; and the sum of (x+y+z) is 2.4 to 4.5: and a liquid medium. Also an ink-jet printing process, a material printed with an ink of the invention and an ink jet printing cartridge containing an ink of the invention

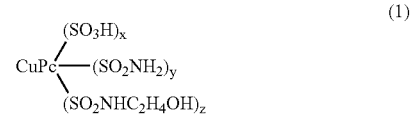
(1)

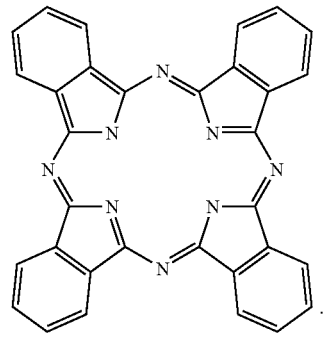

(2)

7 Claims, No Drawings

PHTHALOCYANINE COMPOUNDS USED IN INKS

This invention relates to inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

There are many demanding performance requirements for inks used in ink-jet printing. For example they desirably provide sharp, non-feathered images having good water, light and ozone fastness with a good optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate that could block the printers fine nozzle.

Inks where the colorant is a dye containing a single copper phthalocyanine group such as, for example, C.I. Direct Blue 199 and C.I. Direct Blue 86 are known. Inks comprising newer phthalocyanines are also known, for example as described in U.S. Pat. No. 6,149,722. However, there is a continuing need to provide inks having superior properties in ink-jet printing.

A particular problem for photorealistic quality printing is that of permanence, that is the ability of the colourants used in producing a photographic print to retain their colour properties over a number of years. A key factor contributing to the poor permanence of prints is the quenching of printed colorants by atmospheric pollutants, such as ozone.

According to the present invention there is provided an ink comprising a compound of Formula (1) and salts thereof:

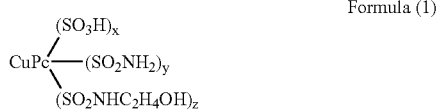

Formula (1)

wherein:

Pc represents a phthalocyanine nucleus of Formula (2);

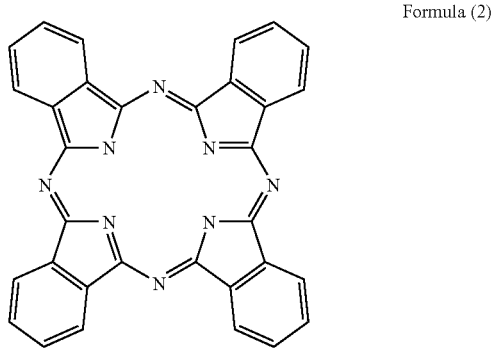

Formula (2)

x is greater than 0 and less than 1.8;
y and z are both greater than 0; and
the sum of (x+y+z) is 2.4 to 4.5: and provided that the compound of Formula (1) is not of formula

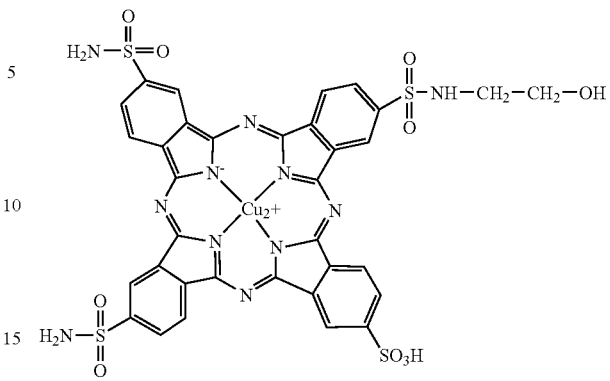

and a liquid medium.

Preferably x is greater than 0 and less than 1.5, more preferably x is greater than 0 and less than 1.2, especially x is greater than 0.05 and less than 1.0, more especially x is greater than 0.05 and less than 0.8 and particularly x is greater than 0.05 and less than 0.5.

Preferably the sum of y+z is in the range of from 2.4 to 4.2, more preferably 2.7 to 4.1.

The sum of (x+y+z) is preferably 3.5 to 4.5, more preferably the sum of (x+y+z) is 3.8 to 4.2.

The values for x, y and z in compounds of Formula (1) all represent statistical averages.

Acid or basic groups on the compounds of Formula (1), particularly acid groups, are preferably in the form of a salt. Thus, the Formulae shown herein include the compounds in free acid and in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. The compounds may be converted into a salt using known techniques.

The compounds of Formula (1) may exist in tautomeric forms other than those shown in this specification. These tautomers are included within the scope of the present invention.

The compounds of Formula (1) may be prepared by condensing copper phthalocyanine carrying sulphonyl chloride groups and optionally sulphonic acid groups with ammonia and ethanolamine. The condensation is preferably performed in water at a pH above 7. Typically the condensation is performed at a temperature of 30 to 70° C. and the condensation is usually complete in less than 24 hours. Ammonia and ethanolamine may be used as a mixture or condensed sequentially with the phthalocyanine.

Copper phthalocyanine carrying sulphonyl chloride groups and optionally sulphonic acid groups may be prepared by chlorosulphonating copper phthalocyanine, e.g. using chlorosulphonic acid and optionally a chlorinating agent (e.g. $POCl_3$, $PCl_5$ or thionylchloride).

Preferred liquid media include water, a mixture of water and organic solvent and organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxyk ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols.

In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may also contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 199, and 307; C.I. Food Black 2; C.I. Direct Black 168 and 195; and C.I. Acid Yellow 23. Addition of such further dyes can increase overall solubility leading to less kogation (nozzle blockage) for the resultant ink.

Preferred inks comprise:
(a) from 0.01 to 30 parts of a compound of Formula (1); and
(b) from 70 to 99.99 parts of a liquid medium.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid ink concentrates that may be used to prepare more dilute inks and reduces the chance of the dyestuffs in the precipitating if evaporation of the liquid medium occurs during storage.

Inks of the present invention are preferably prepared using high purity ingredients and/or by purifying the ink after it has been prepared. Suitable purification techniques are well known, e.g. ultrafiltration, reverse osmosis, ion exchange and combinations thereof (either before or after they are incorporated in a ink according to the present invention).

Preferably the ink has a viscosity of less than 20 cP, more preferably less than 10 cP, especially less than 5 cP, at 25° C. Low viscosity inks are particularly well suited for application to substrates by means of ink-jet printers.

Preferably the ink contains less than 500 ppm, more preferably less than 250 ppm, especially less than 100 pm, more especially less than 10 ppm in total of divalent and trivalent metal ions (other than any divalent and trivalent metal ions bound to a component of the ink). Free divalent and trivalent metals can form insoluble complexes on storage that could block the ink-jet printer nozzles.

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably the ink contains less than 500 ppm, more preferably less than 250 ppm, especially less than 100 pm, more especially less than 10 ppm in total of halide ions. High levels of halide ions can cause detrimental effects such as, for example, corrosion of metal parts in the ink-jet printer heads.

The inks of the present invention display excellent storage stability and provide prints which have attractive, strong cyan shades. In particular prints formed using these inks display excellent light and ozone fastness. Furthermore the colorant used in the inks, that is compounds of Formula (1), may be prepared from cheap intermediates, avoiding the complexity and expense which is involved in manufacturing some of the more elaborate phthalocyanines.

A second aspect of the invention provides an ink comprising:

(a) a compound of Formula (1) and salts thereof:

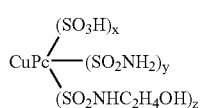

Formula (1)

wherein:

Pc represents a phthalocyanine nucleus of Formula (2);

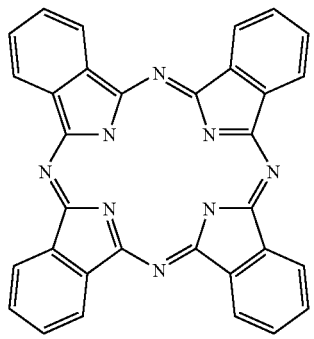

Formula (2)

x is greater than 0 and less than 1.8;
y and z are both greater than 0; and
the sum of (x+y+z) is 2.4 to 4.5:and (b) a liquid medium which comprises a mixture of water and organic solvent or organic solvent free from water.

Preferences for the ink, compounds of Formula (1) and organic solvents are as described in the first aspect of the invention.

A third aspect of the invention provides a process for forming an image on a substrate comprising applying ink according to the first or second aspects of the invention thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application WO 00/48938 and International Patent Application WO 00/55089.

The substrate is preferably paper, plastic, textile, metal or glass, more preferably paper, an overhead projector slide or a textile material, especially paper.

Preferred papers are plain, coated or treated papers which may have an acid, alkaline or neutral character.

A fourth aspect of the present invention provides paper, plastic, a textile, metal or glass, more preferably paper, an overhead projector slide or a textile material, especially paper more especially plain, coated or treated papers printed with ink according to the first or second aspects of the invention or by a process according to the third aspect of the invention.

A fifth aspect of the present invention provides an inkjet printer cartridge comprising a chamber and an ink wherein the ink is in the chamber and the ink is as defined in the first or second aspects of the present invention.

The invention is further illustrated by the following Examples in which all parts and percentages are by weight unless otherwise stated.

EXAMPLE 1

Preparation of Ink Comprising the Following Dye wherein x is 0.8 and (y+z) is 3.2:

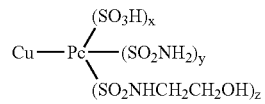

Stage 1

Preparation of:

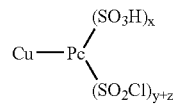

Copper phthalocyanine (118.7 g: molar ratio 1) was added in portions to a mixture of stirred chlorosulphonic acid (310 ml: molar ratio 23) and phosphorous oxychloride (37.8 ml: molar ratio 2) while keeping the temperature in the range of 50 to 60° C. The mixture was heated gradually to 140° C., and kept at that temperature, with stirring, for 3 hours. The reaction mixture was then poured onto a mixture of ice (3 kg), water (1400 ml) and sodium chloride (160 g). The precipitate which formed was collected by filtration at reduced pressure and washed with 3% brine (500 ml) before being used in Stage 2.

Stage 2

Preparation of the Title Dye:

Water (2 liter), ethanolamine (24.6 g, molar ratio 2) and 35% ammonia solution (20 g: molar ratio 2) were mixed in a 5 liter beaker and then placed in an ice bath (pH=11.5, temperature 8° C.). The phthalocyanine sulphonyl chloride paste (molar ratio 1), resulting from stage 1 above, was slowly added to the mixture while the temperature was kept below 5° C. and the pH was maintained at pH 8 by the addition of 10% v/v sodium hydroxide. The reaction mixture was left overnight at room temperature and then heated at 40° C. for 4 hours. Sodium chloride (50% w/v) was added and the resultant precipitate was collected by filtration at reduced pressure and desalinated by dialysis to obtain the title dye wherein x is 0.8 and (y+z) is 3.2.

Stage 3

Preparation of the Ink:

An ink of the present invention was prepared by dissolving 3.5 g of the dye prepared in stage 2 in 100 ml of a liquid medium consisting of 2-pyrrolidone/thiodiglycol/Sufynol™ 465 in a weight ratio of 5:5:1.

EXAMPLES 2 to 9

Stage 1 and 2

Stage 1 and 2 of Example 1 was repeated except that the relative values of x, y and z in the dye in the ink were varied by changing the molar ratios of $POCl_3$, ethanolamine and ammonia as shown in Table 1.

Stage 3

Inks were prepared from the dyes prepared in stage 2 as described in stage 3 of Example 1.

EXAMPLES 10 to 16

Stage 1

The method of Example 1, stage 1, was repeated except that the molar ratio of $POCl_3$ used in each example was as shown in Table 1.

Stage 2

Water (1 liter) and ethanolamine (12 g, molar ratio 1) were mixed and then placed in an ice bath. The phthalocyanine sulphonyl chloride pastes (molar ratio 1), prepared as described in stage 1 were slowly added to the mixture while the temperature was kept below 5° C. and the pH was maintained at pH 8 by the addition of 10% v/v. ammonia solution. The reaction mixture was left overnight at room temperature and then heated at 40° for 4 hours. Sodium chloride (20% w/v) was added and the resultant precipitate was collected by filtration at reduced pressure and desalinated by dialysis to obtain the phthalocyanine dyes described in Examples 10 to 16 of Table 1 below.

Stage 3

Inks were prepared from the dyes prepared in stage 2 as described in stage 3 of Example 1.

TABLE 1

| Dye in Example | $POCl_3$ (molar ratio) | Ethanolamine (molar ratio) | Ammonia (molar ratio) | x | y + z |
|---|---|---|---|---|---|
| 2 | 2 | 4 | 2 | 0.1 | 4.0 |
| 3 | 2 | 6 | 2 | 0.1 | 4.0 |
| 4 | 2 | 2 | 4 | 1.1 | 3.0 |
| 5 | 2 | 2 | 6 | 1.0 | 3.0 |
| 6 | 2.5 | 2 | 4 | 0.4 | 3.4 |
| 7 | 2.5 | 4 | 2 | 0.2 | 3.6 |
| 8 | 2.5 | 2 | 6 | 0.2 | 3.4 |
| 9 | 2.5 | 2 | 2 | 0.6 | 3.2 |
| 10 | 1.5 | 1 | AR | 1.3 | 2.8 |
| 11 | 2 | 1 | AR | 0.8 | 3.2 |
| 12 | 2.5 | 1 | AR | 1.4 | 2.6 |
| 13 | 3 | 1 | AR | 0.8 | 3.2 |
| 14 | 3.5 | 1 | AR | 0.4 | 3.6 |
| 15 | 3.8 | 1 | AR | 0.4 | 3.8 |
| 16 | 1 | 1 | AR | 0.7 | 3.4 |

AR—as required to adjust the pH is step (b) to pH 8.0.

COMPARATIVE EXAMPLE

Stage 1

Preparation of the Comparative Phthalocyanine Dye:

The phthalocyanine dye wherein x is 2, y is 1 and z is 1:

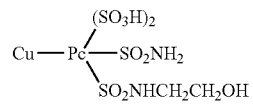

was prepared as described in Example 1 of U.S. Pat. No. 6,149,722 which preparation is incorporated herein by reference.

Stage 2

Preparation of the Comparative Ink:

The compound prepared in stage 1 (3.5 g) was dissolved in 100 ml of a liquid medium consisting of 2-pyrrolidone/thiodiglycol/Sufynol™ 465 in a weight ratio of 5:5:1.

EXAMPLE 34

Ozone Fastness

The Example Inks 1 to 16 and the Comparative Ink were printed onto a variety of papers using a Canon 5800™ IJ printer. The printed substrate was then assessed for ozone stability using an ozone test cabinet from Hampden Test Equipment. The test was carried out for twenty four hours at 40° C. and 50% relative humidity in the presence of 1 part per million of ozone. Fastness of the printed ink to ozone was judged by the difference in the optical density before and after exposure to ozone using a Gretag MacBeth Spectrolino. Thus, the lower the % OD loss the greater the ozone fastness. Results are shown below in Table 2 and these clearly demonstrate that inks based on compounds of this invention display good ozone fastness.

TABLE 2

| Example Ink | Substrate | % OD loss |
|---|---|---|
| Ink 1 | HP Premium Plus | 2 |
| Ink 1 | Canon PR101 | 48 |
| Ink 1 | SEC Premium Photo | 53 |
| Ink 2 | HP Premium Plus | 0 |
| Ink 2 | Canon PR101 | 27 |
| Ink 2 | SEC Premium Photo | 21 |
| Ink 3 | HP Premium Plus | 0 |
| Ink 3 | Canon PR101 | 27 |
| Ink 3 | SEC Premium Photo | 12 |
| Ink 4 | HP Premium Plus | 2 |
| Ink 4 | Canon PR101 | 53 |
| Ink 4 | SEC Premium Photo | 54 |
| Ink 5 | HP Premium Plus | 3 |
| Ink 5 | Canon PR101 | 52 |
| Ink 5 | SEC Premium Photo | 45 |
| Ink 6 | HP Premium Plus | 2 |
| Ink 6 | Canon PR101 | 39 |
| Ink 6 | SEC Premium Photo | 38 |
| Ink 7 | HP Premium Plus | 3 |
| Ink 7 | Canon PR101 | 30 |
| Ink 7 | SEC Premium Photo | 28 |
| Ink 8 | HP Premium Plus | 2 |
| Ink 8 | Canon PR101 | 33 |
| Ink 8 | SEC Premium Photo | 33 |
| Ink 9 | HP Premium Plus | −1 |
| Ink 9 | Canon PR101 | 41 |

TABLE 2-continued

| Example Ink | Substrate | % OD loss |
|---|---|---|
| Ink 9 | SEC Premium Photo | 41 |
| Ink 10 | HP Premium Plus | 2 |
| Ink 10 | Canon PR101 | 43 |
| Ink 10 | SEC Premium Photo | 45 |
| Ink 11 | HP Premium Plus | 1 |
| Ink 11 | Canon PR101 | 37 |
| Ink 11 | SEC Premium Photo | 39 |
| Ink 12 | HP Premium Plus | 4 |
| Ink 12 | Canon PR101 | 55 |
| Ink 12 | SEC Premium Photo | 56 |
| Ink 13 | HP Premium Plus | 3 |
| Ink 13 | Canon PR101 | 23 |
| Ink 13 | SEC Premium Photo | 19 |
| Ink 14 | HP Premium Plus | 0 |
| Ink 14 | Canon PR101 | 17 |
| Ink 14 | SEC Premium Photo | 12 |
| Ink 15 | HP Premium Plus | 1 |
| Ink 15 | Canon PR101 | 15 |
| Ink 15 | SEC Premium Photo | 7 |
| Ink 16 | HP Premium Plus | 2 |
| Ink 16 | Canon PR101 | 28 |
| Ink 16 | SEC Premium Photo | 25 |
| Comparative Ink | HP Premium Plus | 4 |
| Comparative Ink | Canon PR101 | 71 |
| Comparative Ink | SEC Premium Photo | 64 |

Further Inks

The inks described in Tables A and B may be prepared using the compounds made in Examples 1 to 16. Numbers quoted in the second column onwards refer to the number of parts of the relevant ingredient and all parts are by weight. The inks may be applied to paper by thermal or piezo ink-jet printing.

The following abbreviations are used in Table A and B:

PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE A

| Dye of Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 14 | 3.3 | 80 | 2 | | | 10 | | | | 2 | | 6 |
| 15 | 12.0 | 90 | | | | 7 | 0.3 | | 3 | | | |
| 14 | 5.4 | 69 | 2 | 20 | 2 | 1 | | | | | 3 | 3 |
| 15 | 6.0 | 91 | | | 4 | | | | | | 5 | |

TABLE B

| Dye of Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 6 | 0.9 | 85 | | | 10 | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 9 | 2.2 | 75 | 4 | 10 | 3 | | | | 2 | | 6 | |
| 10 | 10.0 | 91 | | | 6 | | | | | | 3 | |

TABLE B-continued

| Dye of Example | Dye Content | Water | PG | DEG | NMP | CET | TBT | TDG | BDL | PHO | 2P | PI2 |
|---|---|---|---|---|---|---|---|---|---|---|---|---|
| 11 | 9.0 | 76 |  | 9 | 7 |  | 3.0 |  |  | 0.95 | 5 |  |
| 12 | 5.0 | 78 | 5 | 11 |  |  |  |  |  |  | 6 |  |
| 13 | 5.4 | 86 |  |  | 7 |  |  |  |  |  | 7 |  |
| 14 | 2.1 | 70 | 5 | 5 | 5 | 0.1 | 0.2 | 0.1 | 5 | 0.1 | 5 |  |
| 15 | 2.0 | 90 |  | 10 |  |  |  |  |  |  |  |  |
| 16 | 2 | 88 |  |  |  |  |  | 10 |  |  |  |  |
| 14 | 5 | 78 |  |  | 5 |  |  | 12 |  |  | 5 |  |
| 15 | 8 | 70 | 2 |  | 8 |  |  | 15 |  |  | 5 |  |
| 14 | 10 | 80 |  |  |  |  |  | 8 |  |  | 12 |  |
| 15 | 10 | 80 |  | 10 |  |  |  |  |  |  |  |  |

The invention claimed is:

1. An ink comprising a compound of Formula (1) and salts thereof:

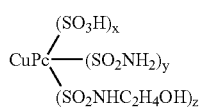

Formula (1)

wherein:

Pc represents a phthalocyanine nucleus of Formula (2);

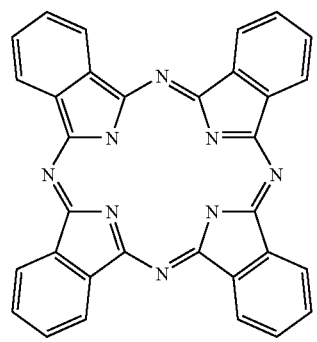

Formula (2)

x is greater than 0.05 and less than 1.0;
y and z are both greater than 0; and
the sum of (x+y+z) is 2.4 to 4.5: and
a liquid medium.

2. An ink comprising:

(a) a compound of Formula (1) and salts thereof:

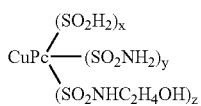

Formula (1)

wherein:

Pc represents a phthalocyanine nucleus of Formula (2);

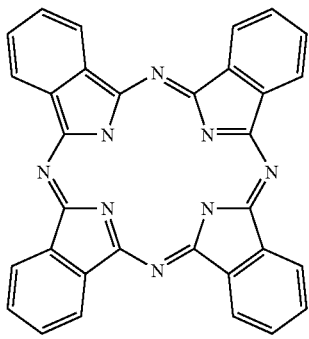

Formula (2)

x is greater than 0.05 and less than 1;
y and z are both greater than 0; and
the sum of (x+y+z) is 2.4 to 4.5: and (b) a liquid medium which comprises a mixture of water and organic solvent or organic solvent free from water.

3. An ink according to claim 2 wherein x is greater than 0.05 and less than 0.5.

4. An ink according to either claim 1 or claim 2 wherein y+z is in the range of from 2.4 to 4.2.

5. A process for forming an image on a substrate comprising applying an ink, according to either claim 1 or claim 2, thereto by means of an ink-jet printer.

6. A paper, plastic, textile, metal or glass material printed with an ink according to either claim 1 or claim 2.

7. An ink-jet printer cartridge comprising a chamber and an ink wherein the ink is in the chamber and the ink is as defined in either claim 1 or claim 2.

* * * * *